United States Patent [19]

Mitschke et al.

[11] 4,177,332

[45] Dec. 4, 1979

[54] 1,1,1-TRIFLUORO-2-CHLOROETHANE AS BLOWING AGENT FOR POLYURETHANE FOAM

[75] Inventors: Karl-Heinz Mitschke, Odenthal; Hans Niederprüm, Monheim; Manfred Kapps, Berg.-Gladb., all of Fed. Rep. of Germany

[73] Assignee: Bayer Aktiengesellschaft, Leverkusen, Fed. Rep. of Germany

[21] Appl. No.: 932,056

[22] Filed: Aug. 8, 1978

[30] Foreign Application Priority Data

Aug. 27, 1977 [DE]  Fed. Rep. of Germany ....... 2738719

[51] Int. Cl.$^2$ .............................................. C08G 18/14
[52] U.S. Cl. ...................................... 521/98; 521/131
[58] Field of Search ................................... 521/98, 131

[56] References Cited

U.S. PATENT DOCUMENTS

| | | | |
|---|---|---|---|
| 3,183,192 | 5/1965 | Bauer | 521/131 |
| 3,583,921 | 6/1971 | Healy et al. | 252/114 |
| 4,076,644 | 2/1978 | Burnt et al. | 521/131 |

FOREIGN PATENT DOCUMENTS 1045644  12/1958  Fed. Rep. of Germany ........... 521/131

*Primary Examiner*—Maurice J. Welsh
*Attorney, Agent, or Firm*—Sprung, Felfe, Horn, Lynch & Kramer

[57] ABSTRACT

In the production of a foamed synthetic material by the reaction of starting materials which undergo a polymerization, polycondensation or polyaddition reaction to produce a high molecular weight synthetic material in the presence of a blowing agent, e.g. a polyurethane, or by foaming an unfoamed thermoplastic synthetic material by means of a blowing agent, the improvement which comprises employing 1,1,1-trifluoro-2-chloroethane as the blowing agent, optionally in admixture with 1,1-difluoro-2-chloroethane.

4 Claims, No Drawings

1,1,1-TRIFLUORO-2-CHLOROETHANE AS BLOWING AGENT FOR POLYURETHANE FOAM

This invention relates to a process for the production of foamed synthetic materials preferably based on polyisocyanates, in particular polyurethane foams, using 1,1,1-trifluoro-2-chloroethane, optionally mixed with 1,1,-difluoro-1,2-dichloroethane.

The production of foamed synthetic materials, e.g. of polyurethanes, with the aid of blowing agents based on fluorochlorinated hydrocarbons is known (see e.g. German Pat. No. 1,045,644).

Blowing agents based on fluorochlorinated hydrocarbons, particularly trichlorofluoromethane (R11) and to a less extent dichlorodifluoromethane (R12) and 1,1,2-trichlorotrifluoroethane (R113) are of great technical importance because they enable, for example, rigid polyurethane foams to be produced in which from 90 to 95% of the cells are closed. The R11 enclosed in the cells is mainly left in them and owing to its advantageous physical properties it gives rise to a foam which has a very low thermal conductivity (see O. Scherer, Technische organische Fluorverbindungen, Fortschr. Chem. Forsch., Vol. 14/2, p. 147 (1968)). Such rigid polyurethane foams are used mainly as insulation against heat and cold in refrigeration apparatus, cold storage rooms, pipes, containers and structural elements and as packaging material and for surface protection. The possible uses thereof in this field are even further increased by the trend to energy saving methods of building by improved insulation.

The use of halogen-substituted alkanes, in particular R11 and R12, was first described in German Pat. No. 1,045,644.

If halogenated alkanes are to be suitable for use as gaseous blowing agents, they must have certain properties, such as a suitable boiling point or vapor pressure, solubility or dispersibility in one of the reactants, for example in the polyester or the polyether, low thermal conductivity, non-toxicity, chemical inertness, non-combustibility, low rate of diffusion, the ability to prevent shrinkage of the foam and freedom from a tendency to swell the cell walls.

The above-mentioned fluorochloroalkanes may be used not only for the production of flexible, semi-rigid and rigid foams based on polyisocyanates, such as polyurethane foams, but also for the production of foams based on polyolefins, polystyrenes and phenol resins, for which various techniques are employed, such as direct foaming, prefoaming (frothing method) or direct gassing in the extruder. (see e.g. Company publication by Kali-Chemie AG, Hanover (1976): "Kaltron, das Treibmittel für Schaumstoffe").

Since perhalogenated fluoro chloroalkanes are very difficult to degrade (see e.g. Nature 249, 810 (1974); Symposium Report of the Gottlieb Duttweiler Institute, Ruschlikon/Zürich, 17/18.2.1977; Aerosol Report, Vol. 16, No. 1/1977, pages 12 and 13), there is a serious need for alternative blowing agents which resemble perhalogenated fluoroalkanes in the advantageous properties thereof, but are easily degraded and therefore ecologically harmless.

A process for the production of foamed synthetic materials, in particular of polyurethane foams, has now been found which completely satisfies this requirement, in which process 1,1,1-trifluoro-2-chloroethane is used as blowing agent, optionally mixed with 1,1-difluoro-1,2-dichloroethane.

The present invention relates to a process for the production of foamed synthetic materials by carrying out the reaction of starting materials for a polymerization, polycondensation or polyaddition reaction to produce high molecular weight synthetic resins in the presence of blowing agents or by foaming an unfoamed thermoplastic synthetic resin by means of a blowing agent in known manner, characterized in that the blowing agent used is 1,1,1-trifluoro-2-chloroethane, optionally as a mixture with 1,1-difluoro-1,2-dichloroethane.

It has surprisingly been found that 1,1,1-trifluoro-2-chloroethane (R 133a), optionally mixed with 1,1-difluoro-1,2-dichloroethane (R 132) is a very suitable blowing agent for the production of foamed synthetic materials, in particular those based on polyurethanes. The quality of the foams produced using these blowing agents is substantially equal to that of products which have been conventionally produced, e.g. using $CFCl_3$ (R11). When R 132 is mixed with R 133a it is generally in up to about 80% and preferably from about 20 to 80% by weight of the mixture of the two.

R 133a and R 132 are incombustible and according to all tests so far carried out they are physiologically harmless (see e.g. Nachrichten Chemie und Technik 24, 1976, page 307 and Aerosol Age, January 1977, page 9). Both substances are readily degradable under the influence of light. The tropospheric life of 133a is only 6.1 years (von Schweinichen, Aerosol Report, April 1977, page 172–180). When assessing this figure, one must take into account that R 133a has only one chlorine atom whereas R 11 which is conventionally used has three chlorine atoms. Experiments carried out by the present applicants show that when $CFCl_3$ is irradiated for 24 hours (Osram-Ultra-Vitalux-Lamps) using radiation corresponding approximately to natural sunlight at a height of several thousand meters, it decomposes to an extent of 0.04% (determined from the resulting quantity of chlorine ions) or 0.13% (determined from the resulting quantity of fluorine ions). The corresponding degrees of decomposition of $CF_3CH_2Cl$ are 53% and 46%.

Both R 133a and its preliminary product R 132 are easily prepared in high yields and excellent purity (greater than 99.99%) by catalytic liquid phase fluorination of unstabilized trichloroethylene, which is an inexpensive mass-produced starting material (German Offenlegungsschrift No. 2,719,021).

Furthermore, it should be noted that in spite of its tropospheric degradability, R 133a has a high thermal and chemical stability, e.g. towards hydrolytic influences and nucleophilic attacks (for example of OH ions or amines). A specially stabilized quality, such as is required when using R 11 for foaming polyurethanes in cases where previously mixed systems of polyols, amine-based catalysts, silicone stabilizers and blowing agents are kept for some time before foaming, is not necessary when using R 133a (or R 132) (see L. M. Zwolinski, Rubber Age, July 1975, page 54). The processing of amine-based polyols may also be carried out quite problem-free with the aid of the new blowing agents.

It is also surprising that R 133a is suitable for use as blowing agent for the production of foam plastics in spite of its substantially lower boiling point of 6.9° C. compared with that of R 11 (R 11=23.7° C.). This is presumably the cause of its ready solubility in the foaming components.

The additional use of R 132 (b.p. =46.8° C.) is suitable in cases where relatively high foaming temperatures occur or where the raw material is stored at relatively high temperatures so that the vapor pressure of the blowing agent becomes too high. In such cases, R 113 ($CF_2Cl$-$CFCl_2$, b.p. =47.7° C.) which is normally used in such cases may be replaced R 132 because R 113, being a perhalogenated alkane, like R 11 is very difficult to degrade.

Production of the foams is carried out by known methods (see Houben-Weyl, Methoden der organischen Chemie, Vol. XIV/2, page 88 (1963); High Polymers, Vol. XVI, "Polyurethanes Chemistry and Technology", by Saunders-Frisch, Interscience Publishers, New York/London, 1962/1964; Kunststoffhandbuch, Volume VII, Vieweg-Höchtlen, Carl-Hanser-Verlag Munich, 1966).

The process according to the present inventiion is suitable for the production of various cellular and porous materials, in particular for the production of foams of synthetic materials. The synthetic materials may be produced by polymerization or polyaddition, and also by polycondensation. The following are mentioned as examples of synthetic materials: polyolefins, such as polyethylene or polypropylene, polystyrene, polyethylstyrene, polyamide, polycarbonate, polysulphone, polyethylene terephthalate, polybutylene terephthalate, polyphenylene oxide, polymethacrylate, polymethacrylonitrile, polyacrylonitrile, polyvinyl chloride, synthetic materials based on cellulose esters, copolymers of the above-mentioned components, acrylonitrile-butadiene-styrene polymers (ABS), mixtures of polysulphone and styrene-acrylonitrile or ABS polymers, mixtures of polycarbonate and ABS polymers, and mixtures of polyvinyl chloride and ABS polymers of styrene-acrylonitrile. Foams of inorganic-organic materials may also be produced according to the present invention, e.g. the synthetic materials described in French Pat. Nos. 1,419,552 and 1,362,003; German Offenlegungsschrift Nos. 1,770,384; 2,227,147; 2,310,559; 2,325,090; 2,359,610; 2,359,607; 2,359,606; 2,359,608; 2,359,609 and 2,359,612.

The blowing agent according to the present invention is preferably added in quantities of about 0.01 to 40%, by weight, most preferably about 0.1 to 30%, by weight, based on the synthetic material or based on the reaction mixture which reacts to produce the synthetic material, but it may also be used in any other quantity familiar to those skilled in the art. The quantity added depends in the individual case on the requirements to be fulfilled by the foamed product.

The blowing agent according to the present invention may also be used in combination with known auxiliary agents, such as nucleating agents or nucleus-forming agents (e.g. talcum, $MgCO_3$, $CaCO_3$, $ZnCO_3$, $CaSO_4$, $NaHCO_3$, polytetrafluoroethylene powder or polyhexafluoropropylene powder), fillers (e.g. glass fibers, $CaCO_3$, $MgCO_3$, chalk, kaolin or $TiO_2$), lubricants (e.g. waxes, paraffins or fatty acid esters), stabilizers (e.g. UV absorbents or light and heat stabilizers), bonding agents (e.g. paraffin oil, plasticizers, butyl stearate or resin solutions), chemical fillers (e.g. $SiO_2$, MgO, ZnO or $ZnCO_3$), peroxides, pigments, dyes, antioxidants and/or antiozonants.

The process according to the present invention is therefore suitable for the production of any foams in which "physical blowing agents" have hitherto been used, i.e. in which the action of the blowing agent is due to evaporation of a readily volatile inert liquid. The preferred foams obtainable by the process according to the present invention include the known foams based on polyisocyanates. The known polyurethane foams are particularly preferred. In addition to polyurethane foams, which are particularly preferred, the polyisocyanate-based foams also include foams containing isocyanurate groups, which foams are obtained by the known process of trimerization of organic polyisocyanates during the reaction which results in the foam; also foams containing carbodiimide groups, which are obtained in known manner by the condensation of isocyanate groups accompanied by the formation of carbodiimide groups during the reaction by which the foam is formed; mixed types (containing isocyanurate and carbodiimide groups and in some cases also urethane groups) which are obtained by the reaction of polyisocyanates with sub-equivalent quantities of polyhydroxyl compounds in the presence of trimerization catalysts and/or carbodiimidization catalysts; and inorganic-organic foams obtained, for example, by the reaction of polyisocyanates with alkali metal silicate solutions and/or dispersions, optionally in the presence of additives, according to the above-mentioned publications.

The polyisocyanates used as starting components in the preferred process for the production of foamed synthetic materials based on polyisocyanates may be any aliphatic, cycloaliphatic, araliphatic, aromatic or heterocyclic polyisocyanates, such as those described, for example, by W. Siefken in Justus Liebigs Annalen der Chemie, 562, pages 75 to 136, but they should preferably be liquid at room temperature. The following are examples: ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl-cyclohexane (German Auslegeschrift No. 1,202,785, U.S. Pat. No. 3,401,190), hexahydrotolylene-2,4-diisocyanate and -2,6-diisocyanate and mixtures of these isomers, hexahydrophenylene-1,3-diisocyanate and/or 1,4-diisocyanate, perhydrodiphenylmethane-2,4'-diisocyanate and/or 4,4'-diisocyanate, phenylene-1,3-diisocyanate and -1,4-diisocyanate, tolylene-2,4-diisocyanate and -2,6-diisocyanate and mixtures of these isomers, diphenylmethane-2,4'-diisocyanate and/or 4,4'-diisocyanate, naphthylene-1,5-diisocyanate, triphenylmethane-4,4',4"-triisocyanate, polyphenyl-polymethylene polyisocyanates which may be obtained by aniline/formaldehyde condensation followed by phosgenation and which have been described, for example, in British Pat. Nos. 874,430 and 848,671, m- and p-isocyanatophenyl-sulphonyl isocyanates according to U.S. Pat. No. 3,454,606, perchlorinated aryl polyisocyanates, such as those described, for example, in German Auslegeschrift No. 1,157,601 (U.S. Pat. No. 3,277,138), polyisocyanates containing carbodiimide groups, as described in German Pat. No. 1,092,007 (U.S. Pat. No. 3,152,162), diisocyanates of the type described in U.S. Pat. No. 3,492,330, polyisocyanates containing allophanate groups as described, e.g. in British Pat. No. 994,890, in Belgian Pat. No. 761,626 and in published Dutch patent application No. 7,102,524, polyisocyanates containing isocyanurate groups, e.g. as described in U.S. Pat. No. 3,001,973, in German Pat. Nos. 1,022,789; 1,222,067 and 1,027,394 and in German Offenlegungsschrift Nos. 1,929,034 and 2,004,048, polyisocyanates containing urethane groups as described, e.g. in Belgian Pat. No. 752,261 or in U.S. Pat. No. 3,394,164 polyisocyanates containing acylated urea groups according to German Pat. No. 1,230,778, polyisocyanates containing biuret groups as described, e.g. in German Pat. No. 1,101,394 (U.S. Pat. Nos. 3,124,605 and 3,201,372) and in British Pat. No. 889,050, polyisocyanates prepared by telomerization reactions as described, for example, in U.S. Pat. No. 3,654,106, polyisocyanates containing ester groups, such as those mentioned, for example, in British Pat. Nos. 965,474 and 1,072,956, in U.S. Pat. No. 3,567,763 and in German Pat. No. 1,231,688, reaction products of the above-mentioned isocyanates with acetals according to German Pat. No. 1,072,385 and polyisocyanates containing polymeric fatty acid groups according to U.S. Pat. No. 3,455,883.

It is preferred to use the readily available polyisocyanates which are normally used for the production of polyisocyanate-based foams, in particular the production of polyurethane foams, on a large technical scale. Examples of such isocyanates include: 2,4-diisocyanatotoluene, 2,6-diisocyanatotoluene, mixtures of these isomers, 4,4'-diisocyanatodiphenylmethane, 2,4'-diisocyanatodiphenylmethane, polyisocyanate mixtures of the diphenylmethane series containing these isomers, as well as higher homologues of these diisocyanates, which mixtures may be obtained by the known process of phosgenating aniline/formaldehyde condensates; diphenylmethane diisocyanates containing carbodiimide and/or urethoneimine groups, such as the diisocyanates obtained according to German Pat. No. 1,092,007 (U.S. Pat. No. 3,152,162); and polyisocyanates containing urethane groups, such as those obtained by the reaction of 1 mol of 4,4-diisocyanatodiphenylmethane with from 0.05 to 0.3 mol of low molecular weight diols or triols, preferably polypropylene glycols having a molecular weight of below 700. Mixtures of the last-mentioned preferred polyisocyanates are also preferred.

The starting components used according to the present invention may also include compounds, generally having a molecular weight of about 62 to 10,000, which contain at least two isocyanate-reactive hydrogen atoms. These may be compounds containing amino groups, thiol groups or carboxyl groups, but are preferably polyhydroxyl compounds, in particular compounds containing from 2 to 8 hydroxyl groups, especially those having a molecular weight of about 200 to 10,000, preferably about 1000 to 6000, e.g. polyesters, polyethers, polythioethers, polyacetals and polyester amides having at least two, generally from 2 to 8, preferably from 2 to 4, hydroxyl groups, such as the compounds known for the production of cellular and noncellular polyurethanes. In the process according to the present invention, it is often advantageous to use the above-mentioned relatively high molecular weight polyhydroxyl compounds as mixtures with up to about 95%, by weight, preferably up to about 50%, by weight, based on the total quantity of polyhydroxyl compounds, of low molecular weight polyols having a molecular weight of about 62 to 200. The following are examples of such low molecular weight polyols: ethylene glycol, propane-1,2-diol, propane-1,3-diol, butane-1,2-diol, butane-1,4-diol, hexane-1,6-diol, decane-1,10-diol, diethylene glycol, triethylene glycol, tetraethylene glycol, dipropylene glycol, tripropylene glycol, glycerol, trimethylolpropane, and the like.

Suitable polyesters containing hydroxyl groups include, e.g. reaction products of polyhydric, preferably dihydric alcohols, optionally with the addition of hydric alcohols, and polybasic, preferably dibasic, carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or may be unsaturated. The following are mentioned as examples:

succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethyl terephthalate and terephthalic acid-bis-glycol esters. The following are examples of suitable polyhydric alcohols: ethylene glycol, propylene glycol-(1,2) and -(1,3), butylene glycol-(1,4) and -(2,3), hexanediol-(1,6), octanediol-(1,8), neopentyl glycol, cyclohexane dimethanol (1,4-bis-hydroxymethylcyclohexane), 0.001 to 10% by weight, based on the quantity of compounds having at least two isocyanate-reactive hydrogen atoms and a molecular weight of about 62 to 10,000.

Surface active additives (emulsifiers and foam stabilizers) may also be used according to the present invention. Suitable emulsifiers include, e.g. the sodium salts of ricinoleic sulphonate or of fatty acids or salts of fatty acids with amines, such as oleic acid diethylamine or stearic acid diethanolamine. Alkali metal or ammonium salts of sulphonic acids, such as dodecylbenzene sulphonic acid or dinaphthylmethane disulphonic acid, or of fatty acids, such as ricinoleic acid, or of polymeric fatty acids may also be used as surface active additives.

Suitable foam stabilizers are particularly the water-soluble polyether siloxanes. These compounds generally have oxide, propylene oxide, butylene oxide, tetrahydrofuran, styrene oxide or epichlorohydrin, either on their own, e.g. in the presence of $BF_3$, or by addition to these epoxides, optionally as mixtures or successively, to starting components having reactive hydrogen atoms, such as alcohols or amines, e.g. water, ethylene glycol, propylene glycol-(1,3) or -(1,2), trimethylolpropane, 4,4'-dihydroxydiphenylpropane, aniline, ammonia, ethanolamine or ethylene diamine. Sucrose polyethers may also be used according to the present invention, e.g those described in German Auslegesschrift Nos. 1,176,358 and 1,064,938. It is in many cases preferred to used polyethers which contain predominantly primary OH groups (up to 90%, by weight, based on all the OH groups present in the polyether). Polyethers modified with vinyl polymers, e.g. the compounds obtained by polymerization of styrene or acrylonitrile in the presence of polyethers (U.S. Pat. Nos. 3,383,351; 3,304,273; 3,523,093 and 3,110,695 and German Pat. No. 1,152,536) are also suitable, as well as polybutadienes which have OH groups.

Particularly to be mentioned among the polythioethers are the condensation products obtained by reacting thiodiglycol on its own and/or with other glycols, dicarboxylic aicds, formaldehyde, aminocarboxylic acids or amino alcohols. The products obtained are polythio mixed ethers, polythio ether esters or polythio ether ester amides, depending on the co-components.

Suitable polyacetals include, for example, the compounds which may be prepared from the reaction of glycols, such as diethylene glycol, triethylene glycol, 4,4'-dioxethoxy-diphenyl dimethylmethane and hexane diol, with formaldehyde. Suitable polyacetals for the purposes of the present invention may also be prepared by the polymerization of cyclic acetals.

The polycarbonates containing hydroxyl groups used may be of the known type, for example those which may be prepared by the reaction of diols, such as propane diol-(1,3), butane diol-(1,4) and/or hexane diol-(1,6), diethylene glycol, triethylene glycol or tetraethylene glycol, with diaryl carbonates, e.g. diphenyl carbonate, or with phosgene.

Suitable polyester amides and polyamides include, for example, the predominantly linear condensates prepared from polybasic saturated and unsaturated carboxylic acids or the anhydrides thereof and polyfunctional saturated and unsaturated amino alcohols, diamines, polyamines and mixtures thereof.

Polyhydroxyl compounds already containing urethane or urea groups and modified or unmodified natural polyols, such as castor oil, carbohydrates or starch may also be used. Addition products of alkylene oxides and phenol/formaldehyde resins or of alkylene oxides and urea/formaldehyde resins are also suitable for the purposes of the present invention.

Representatives of these compounds which may be used according to the present invention have been described, for example, in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Höchtlen, Carl-Hanser-Verlag, Munich, 1966, e.g. on pages 45 to 71.

The reactants are preferably put into the process according to the present invention in proportions corresponding to an isocyanate index of about 70 to 800, preferably about 90 to 130 (an isocyanate index of 100 corresponds to the presence of equivalent quantities of isocyanate groups and isocyanate-reactive hydrogen atoms in the reaction mixture).

According to the present invention, other organic compounds may also be used as blowing agents, but they should preferably be readily volatile. Suitable organic blowing agents include, for example, acetone, ethyl acetate, halogen-substituted alkanes which are degradable in the stratosphere, such as methylene chloride, chloroform, ethylidene chloride and vinylidene chloride, and butane, hexane, heptane and diethyl ether. According to a preferred method of carrying out the process according to the present invention, the blowing agents used consist of azeotropic mixtures of the blowing agents which are an essential feature of the present invention and other environmentally harmless blowing agents of the type exemplified above, so that the boiling point of the blowing agent may be adjusted as required in each individual case.

Additional compounds which accelerate the isocyanate addition reaction are also often used in the process according to the present invention, e.g. organo-metallic compounds, in particular organo-tin compounds, such as tin(II) acetate, tin(II) octoate, tin(II) ethyl hexoate and tin(II) laurate, and the dialkyl tin salts of carboxylic acids, e.g. dibutyl tin diacetate, dibutyl tin dilaurate, dibutyl tin maleate or dioctyl tin diacetate.

The process according to the present invention may also be modified by the use of known compounds for catalyzing the trimerization of isocyanates so that polyurethane foams which contain isocyanurate groups are obtained. In this embodiment of the process according to the present invention it is particularly suitable to use isocyanate indices substantially higher than 100 because free isocyanate groups must in this case be available not only for the reaction with the active hydrogen atoms, but also for trimerization. The trimerization catalysts used may be any compounds which initiate a polymerization reaction of the isocyanate group at room temperature. Such compounds have been described, for example, in French Patent No. 1,441,565, Belgian Pat. Nos. 723,153 and 723,152 and in German Offenlegungsschrift No. 2,301,408. They are mainly basic salts, such as sodium acetate and potassium acetate, or mono-nuclear or higher nuclear Mannich bases obtained from phenols which are capable of being condensed and which may be substituted with alkyl, aryl or aralkyl groups, oxo compounds and secondary amines, especially those Mannich bases in which the oxo compound used for the preparation thereof was formaldehyde and the secondary amine was dimethylamine. According to IR spectroscopic analyses, substantial proportions of carbodiimide structures are formed in the foams, the proportion in the foams depending on the conditions, particularly on the reaction temperature reached. The proportion of carbodiimide structures of the foams may be increased by means of known catalysts for the preparation of carbodiimides, particularly organic phosphorus compounds having a valency of from 3 to 5, such as phospholines, phospholine oxides, tertiary phosphines and the like. The process according to the present invention may also be carried out entirely without compounds containing isocyanate-reactive groups so as to produce foams which contain isocyanurate groups and possibly also carbodiimide groups, but no urethane groups. The blowing agents according to the present invention are also eminently suitable for the production of polyisocyanate-based foams of this type. Further details may be found, for example, in "Polyurethanes, Chemistry and Technology", Vols. I and II, Saunders-Frisch, Interscience Publishers, 1962 and 1964.

The quantity of polymerization catalyst to be used is largely determined by the nature and in some cases basicity of the catalyst. If isocyanurate groups are to be formed at the same time in the process according to the present invention, the trimerisation catalysts are generally used in quantities of about 0.1 to 10%, by weight, preferably about 0.2 to 5%, by weight, based on the polyisocyanate component.

Other representatives of catalysts which may be used according to the present invention and details concerning the activity of the catalysts may be found in Kunststoff-Handbuch, Volume VII, published by Vieweg and Höchtlen, Carl-Hanser-Verlag, Munich 1966, e.g. on pages 96 to 102.

Catalysts which accelerate the formation of polyurethane are generally used in quantities of from about 0.001 to 10%, by weight, based on the quantity of compounds having at least two isocyanate-reactive hydrogen atoms and a molecular weight of about 62 to 10,000.

Surface active additives (emulsifiers and foam stabilizers) may also be used according to the present invention. Suitable emulsifiers include, e.g. the sodium salts of ricinoleic sulphonate or of fatty acids or salts of fatty acids with amines, such as oleic acid diethylamine or stearic acid diethanolamine. Alkali metal or ammonium salts of sulphonic acids, such as dodecylbenzene sulphonic acid or dinaphthylmethane disulphonic acid, or of fatty acids, such as ricinoleic acid, or of polymeric fatty acids may also be used as surface active additives.

Suitable foam stabilizers are particularly the water-soluble polyether siloxanes. These compounds generally have a polydimethyl siloxane group attached to a copolymer of ethylene oxide and propylene oxide. Foam stabilizers of tyis type have been described, for example, in U.S. Pat. No. 2,764,565.

Other additives which may also be used according to the present invention include reaction retarders, e.g. substances which are acid in reaction, such as hydrochloric acid or organic acid halides, known cell regulators, such as paraffins or fatty alcohols or dimethyl polysiloxanes, pigments, dyes known flame retarding agents, such as tris-chloroethylphosphate or ammonium phosphate and polyphosphate, stabilizers against ageing and weathering, plasticizers, fungistatic and bacteriostatic substances and fillers, such as barium sulphate, kieselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances which may be used according to the present invention and details concerning the use and mode of action of these additives may be found in Kunststoff-Handbuch, Volume VII, published in Vieweg and Höchtlen, Carl-Hanser-Verlag, Munich 1966, e.g. on pages 103 to 113.

The process according to the present invention may be employed both for producing foams under unrestricted conditions and for producing foams inside molds, especially for producing foams having a non-cellular surface skin.

For producing such foams inside molds, the reaction mixture is introduced into a mold which may be made of a metal, e.g. aluminum, or a synthetic material, e.g. an epoxide resin. The reaction mixture foams inside the mold to form the molded product. Foaming in the mold may be carried out either to produce a molded product having a cellular structure on its surface or to produce a molded product having a non-cellular skin and a cellular core. According to the present invention, one or other result may be obtained by either introducing into the mold just sufficient reaction mixture to fill the mold with foam after the reaction or by introducing a larger quantity of reaction mixture than is necessary for filling the interior of the mold with foam. The last-mentioned method is known as "overcharging", a procedure which has been described, e.g. in U.S. Pat. Nos. 3,178,490 and 3,182,104. When this last-mentioned method is employed, foams having a non-cellular surface skin are obtained.

Cold setting foams may also be produced according to the present invention (see British Pat. No. 1,162,517, German Offenlegungsschrift No. 2,153,086).

The internal mold release agents known in the art, such as those described, for example, in German Offenlegungsschrift Nos. 1,953,937 and 2,121,670, may also be used for producing molded foams having a non-cellular surface skin by the process according to the present invention.

To carry out the process according to the present invention, the starting components are preferably reacted together by the known one shot process, often using mechanical devices e.g. those described in U.S. Pat. No. 2,764,565. Details concerning processing apparatus which may also be used according to the present invention may be found in Kunststoff Handbuch, Volume VII, published by Vieweg and Höchtlen, Carl-Hanser-Verlag, Munich 1966, e.g. on pages 121 to 205.

The process may be employed for the production of rigid products used for the manufacture of furniture parts, car body parts, technical apparatus and structural elements, as well as for the production of semi-rigid to flexible products for the manufacture of safety cushioning in the construction of motor vehicles, elastic shoe soles, shock absorbers, etc.

The process according to the present invention is described in the following illustrative example:

EXAMPLE

Production of rigid polyurethane foams, using monofluorotrichloromethane (blowing agent A), 1,1,1-trifluoro-2-chloroethane (blowing agent B) and 1,1-difluoro-1,2-dichloroethane (blowing agent C) as blowing agents. The foams were produced from the following different formulations:

Formulation I:
- 85 g of a polyether polyol (OH number 380, viscosity at 25° C. 13,000 mPa.s) obtained by the propoxylation of saccharose;
- 15 g of a phosphorus-containing flame retarding agent, OH number 450, which is capable of being chemically fixed in the product;
- 1.5 g of a silicone stabilizer based on a polysiloxane which is modified with polyether groups in side positions;
- 0.5 g of water;
- 2.0 g of dimethyl cyclohexylamine;
- 28.0 g of blowing agent;
- 115 g of a commercial polyisocyanate mixture of the diphenylmethane series, viscosity 200 mPa.s/20° C., prepared by a phosgenation of aniline/$CH_2O$ condensates.

Formulation II:
- 80 g of a polyether polyol (OH number 380, viscosity at 25° C. 13,000 mPa.s); obtained by the propoxylation of saccharose;
- 12 g of a polyether polyol (OH number 380, viscosity at 25° C. 600 mPa.s) obtained by the propoxylation of trimethylolpropane;
- 8 g of a diol (OH number 490) obtained by the ethoxylation of ethylamine;
- 1.5 g of a silicone stabilizer based on a polysiloxane modified with polyether groups in side positions;
- 2.0 g of water;
- 1.3 g of dimethyl cyclohexylamine;
- 38 g of blowing agent;
- 130 g of the commerical polyioscyanate mixture used in formulation I.

The polyols were mixed with the additives and blowing agents by stirring in a cardboard cup. The quantity of blowing agent evaporating as a result of the mixing process was replaced, the isocyanate was added and the mixture was vigorously stirred (all components had been adjusted to a temperature of 20° C. before mixing). In the case of blowing agent B, the polyol additive component was first cooled to about 5° C. and blowing agent was stirred in at this temperature. The mixture was then carefully warmed to 20° C. As soon as the reaction mixture had been prepared, it was poured into a mold of packing paper (square base 20×20 cm, height 14 cm). The cream time and gel time were measured during the foaming process.

The data obtained from the measurements carried out on the various formulations using the various blowing agents are shown in the following Table:

Table

|  | Formulation I Blowing agent | | | Formulation II Blowing agent | | |
| --- | --- | --- | --- | --- | --- | --- |
|  | A | B | C | A | B | C |
| Cream time [s] | 30 | 32 | 20 | 13 | 13 | 12 |
| Gel time [s] | 130 | 136 | 87 | 102 | 123 | 95 |
| Gross density [kg/m$^3$] | 33 | 33 | 26 | 21 | 21.5 | 19 |
| Compressive strength [MPa] | | | | | | |
| in the direction of foaming | 0.23 | 0.22 | 0.16 | — | — | — |
| perpendicularly to the direction of foaming | 0.12 | 0.11 | 0.10 | — | — | — |
| Dimensional stability (change in % vol) | | | | | | |
| 3 h, −30° C. | 0 | 0 | −2 | — | — | — |
| 5 h, +100° C. | 0 | 0 | +4 | — | — | — |

It will be appreciated that the instant specification and examples are set forth by way of illustration and not limitation and that various modifications and changes may be made without departing from the spirit and scope of the present invention.

What is claimed is:

1. In the production of a foamed synthetic material by the reaction of starting materials which undergo a polymerization reaction to produce a high molecular weight synthetic material in the presence of a blowing agent or by foaming an unfoamed thermoplastic synthetic material by means of a blowing agent, the improvement which comprises employing 1,1,1-trifluoro-2-chloroethane as the blowing agent.

2. A process according to claim 1, wherein 1,1-difluoro-1,2-dichloroethane is mixed with the 1,1,1-trifluoro-2-chloroethane in up to about 80% by weight of the mixture of the two.

3. A process according to claim 1, wherein the starting materials react to form a polyurethane foam.

4. A process according to claim 3, wherein 1,1-difluoro-1,2-dichloroethane is mixed with the 1,1,1-trifluoro-2-chloroethane in about 20 to 80% by weight of the mixture of the two.

* * * * *